(12) United States Patent
Szpur (10) Patent No.: US 6,368,063 B2
(45) Date of Patent: Apr. 9, 2002

(54) CAVITY TURBINE

(76) Inventor: Roman Szpur, 4366 Sillman Pl., Kettering, OH (US) 45440

( * ) Notice: Subject to any disclaimer, the term of this patent is extended or adjusted under 35 U.S.C. 154(b) by 0 days.

(21) Appl. No.: 09/752,271

(22) Filed: Dec. 29, 2000

Related U.S. Application Data (63) Continuation-in-part of application No. 09/617,358, filed on Jul. 17, 1999.

(51) Int. Cl.$^7$ .............................. B63H 1/26; B64C 11/16
(52) U.S. Cl. ..................................... 416/197 A; 416/246
(58) Field of Search ........................ 416/197 R, 197 A, 416/244 R, 245 R, 246

(56) References Cited

U.S. PATENT DOCUMENTS

| | | | | |
|---|---|---|---|---|
| 457,384 A | * | 8/1891 | Stoner | 416/197 A |
| 459,184 A | * | 9/1891 | Hawkins | 416/197 R |
| 1,646,673 A | * | 10/1927 | Wilson | 416/197 A |
| D207,477 S | * | 4/1967 | McLarty | 416/197 A |
| 3,942,909 A | * | 3/1976 | Yengst | 416/197 A |
| 4,005,947 A | * | 2/1977 | Norton et al. | 416/197 A |
| 4,177,009 A | * | 12/1979 | Baum, Sr. et al. | 416/197 A |
| 4,364,710 A | * | 12/1982 | Campbell | 416/142 |
| 5,226,806 A | * | 7/1993 | Lubbers | 416/197 A |
| 6,036,154 A | * | 3/2000 | Pearce | 416/244 R |

FOREIGN PATENT DOCUMENTS

| | | | | |
|---|---|---|---|---|
| FR | 797106 | * | 4/1936 | 416/197 A |
| IT | 508969 | * | 1/1955 | 416/197 A |
| JP | 69761 A | * | 5/1980 | 416/197 A |
| SU | 1150394 A | * | 4/1985 | 416/197 A |

* cited by examiner

Primary Examiner—John E. Ryznic
(74) Attorney, Agent, or Firm—R. William Graham

(57) ABSTRACT

A cavity vertical turbine includes a rotatably driven electric generator or air compressor, a drive shaft operably connected to the electric generator or air compressor to cause rotation thereof, a first member having a cavity vertical surface and being connected to the shaft such that the cavity vertical surface opposes the drive shaft such that the cavity surface opposes the drive shaft in a spaced relation therefrom, a second member having a cavity surface and connected to the shaft such that said cavity surface opposes the drive shaft in a spaced relation therefrom, wherein the cavity surfaces are further characterized to be in opposing partially overlapping relation to one another and a device for suspending the members in a manner which permits freedom of movement between an operable and inoperable position by virtue of forces of air current directed at the members.

18 Claims, 9 Drawing Sheets

CAVITY TURBINE

This is a continuation-in-part of U.S. Ser. No. 09/617,358 filed Jul. 17, 1999.

BACKGROUND OF THE INVENTION

1. Field of the Invention

The present invention relates to the field of natural energy. More particularly, the invention relates to wind driven cavity turbines.

2. Related Art

There exist numerous types of natural energy driven devices. In the field of wind driven devices, the most common type of device is the windmill. The windmills typically include a plurality of blades or foils and operate on a principle by which air current forces rotation of the blades when properly disposed into a wind current. Here lies a basic flaw in windmills. Particularly, they must be directed into the wind current in order to operate. Some windmills have utilized tails in order to orient the blades into the wind current. However, these designs require a relatively significant amount of wind in order to achieve proper orientation and operation.

Also, wind turbine machines of various designs have been previously proposed for use in converting wind energy to electrical energy. Machines of the type utilizing a plurality of exposed blades rotating about a horizontal axis are in commercial use in a number of different locations. Many such designs lack sufficient structural integrity under heavy wind conditions.

Prior wind turbines typically utilize a rotor which is rotatable about a vertical axis. The rotor normally includes a plurality of blades. Also, pluralities of stationary wind deflectors or wind-directing blades have been used around the rotor to deflect air toward the rotor blades. The typical wind deflectors are generally planar or slightly curved devices which are vertically oriented and are positioned around the perimeter of the rotor.

The prior commonly owned invention U.S. Ser. No. 09/617,358 disclosed an improvement over the art by providing a cavity vertical turbine. Even with these improvements, there continues to remain a need to improve the manner in which we harvest the wind as a natural resource. It is desired that there be a wind driven system which is operational without requiring orientation to face an existing prevailing wind current and which is safely operably disposable in severe wind conditions. Accordingly, the present invention aims to provide such a system.

BRIEF SUMMARY OF THE INVENTION

It is an object to improve wind driven energy producing devices.

It is another object to provide a cavity vertical turbine.

It is yet another object to provide a wind driven turbine which is operably safe at relatively high winds.

Accordingly, the present invention is directed to a cavity vertical turbine which aims to meet the aforesaid objectives. The cavity vertical turbine includes a rotatably driven electric generator or air compressor, a drive shaft operably connected to the electric generator or air compressor to cause rotation thereof, a first member having a cavity surface and being connected to the shaft such that the cavity surface opposes the drive shaft in a spaced relation therefrom, a second member having a cavity surface and being connected to the shaft such that the cavity surface opposes the drive shaft in a spaced relation therefrom, and wherein the cavity surfaces are further characterized to be in opposing partially overlapping relation to one another. Suspending supports are provided for the first member and the second member in a manner which permits freedom of movement between an operable and inoperable position by virtue of forces of air current directed at said members.

The first and second members can be, for example, hemispherical or hemi-cylindrical. The cavity surfaces overlap in a manner such that surface area overlapping portions of the cavity surfaces are less than surface area of non-overlapping portions of cavity surfaces.

Further, the drive shaft is movably connected at one end in a manner to permit the cavity members a degree of freedom of movement from a normally vertically disposed position toward a horizontal position. Thus, in severely extreme wind conditions which can occur in a hurricane or the like, the cavity members are caused to be driven toward a horizontal position and by connections to the drive shaft cause the shaft to correspondingly move into the horizontal position.

Other objects and advantages will be readily apparent to those skilled in the art upon viewing the drawings and reading the detailed description hereafter.

DETAILED DESCRIPTION OF THE INVENTION

Referring now to the drawings, a cavity vertical turbine the present invention is shown in several embodiments of the Figures set forth herewith. The cavity vertical turbines described herein are shown here as vertically disposed cavity vertical turbines. Several components are common to each embodiment. Namely, each embodiment is operably connected to a rotationally driven electric generator 12 (or air compressor). The generator 12 (or air compressor) is operably connected to a rotor drive shaft 14 upon which rotation thereof causes rotation of the electrical producing components of the generator 12 (or air compressor) thereby producing electricity therefrom ( or compressed air for driving existing steam turbines for example to produce electricity in a conventional power station).

Figure 1:
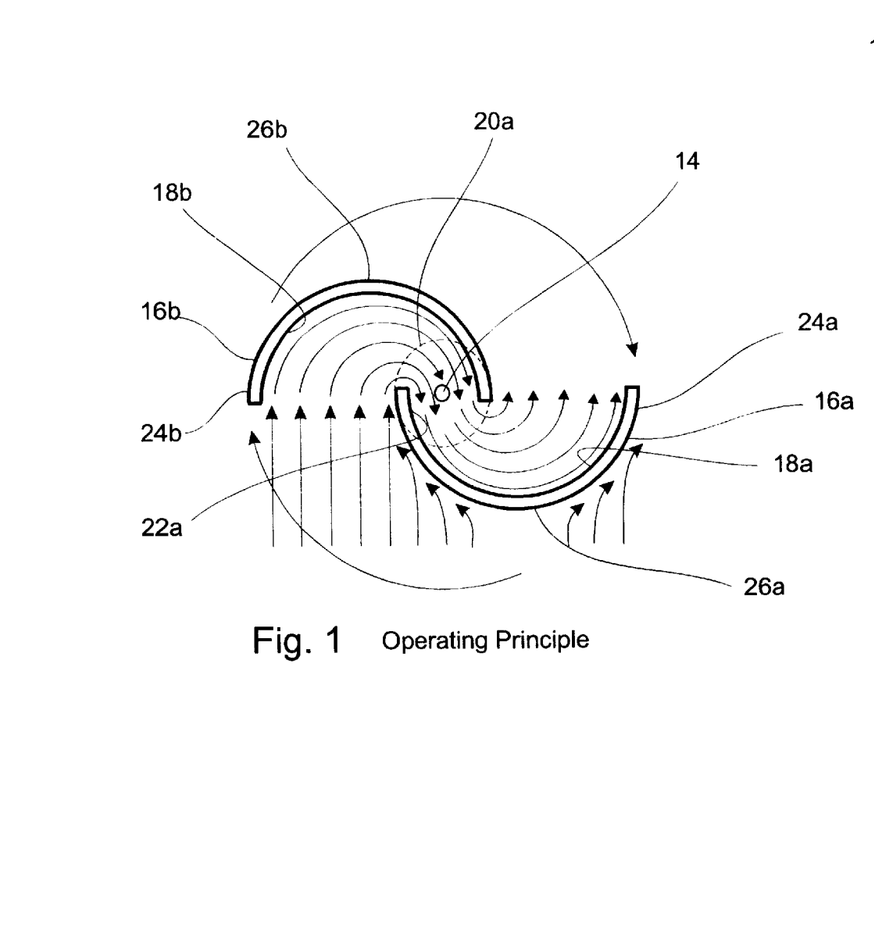
FIG. 1 is a cross-section view through line 1—1 of FIG. 2 depicting the operating principle of a cavity member of the present invention.
Figure 2:
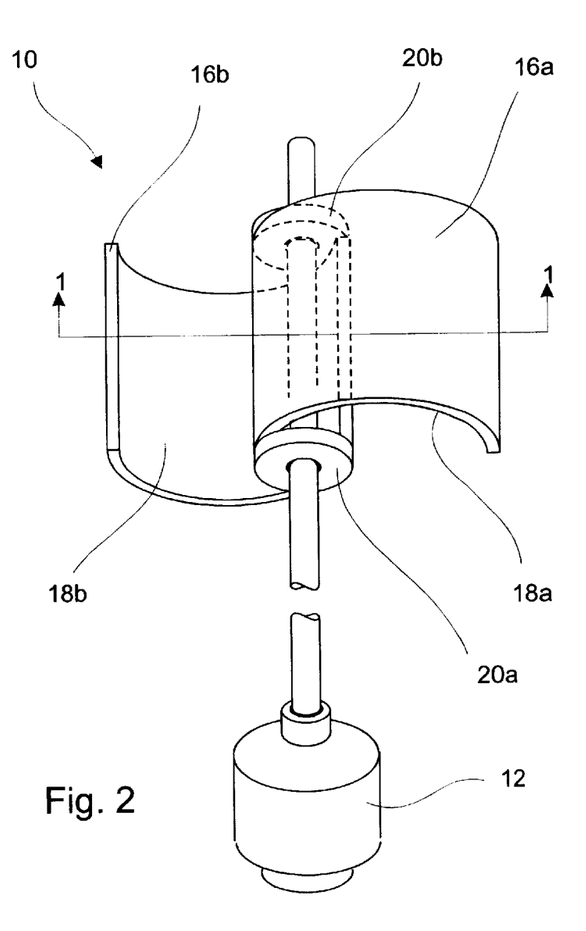
FIG. 2 is a perspective view of an embodiment of a cavity vertical turbine of the present invention.

Turning now to the cavity vertical turbine 10 as shown in FIG. 2, there are hemi-cylindrical members 16a and 16b, each of which having a cavity surface 18a and 18b, respectively, (see FIG. 1). The hemi-cylindrical and hemi-spherical and members described herein can be made of a rigid or semi-rigid material. The members 16a and 16b are connected to the rotor drive shaft 14 by way of annular plates 20a and 20b which are axially spaced from one another and fixably interconnect the rotor drive shaft 14 and the ends 22a and 22b, respectively.

The cavity surfaces 18a and 18b opposes the rotor drive shaft 14 in a spaced relation from the rotor drive shaft 14. The ends 22a and 22b of members 14a and 14b, respectively, are disposed adjacent one another in a manner such that a portion of cavity surfaces 18a and 18b are in opposing partially overlapping relation to one another.

The members 16a and 16b include ends 24a and 24b, respectively, which are in non-adjacent relation to one another such that a remaining portion of the cavity surfaces 18a and 18b, respectively in a non-overlapping relation to one another. In other words, this portion remains exposed to capture wind normal thereto. The non-overlapping portions of cavity surfaces 18a and 18b are greater than the overlapping portions.

As seen in FIG. 1, air is captured by one non-overlapping portion of cavity surface 18b, the wind is deflected toward a space between the ends 22a and 22b and onto the cavity surface 18a and out from the cavity 18a. The forces drive the rotation of the members 16a and 16b as shown. Also, a feature of the design of the invention is the convex surfaces 26a and 26b of members 16a and 16b, respectively. The surfaces 26a and 26b deflect the air to help drive the rotation of the cavity vertical turbine 10. For example, a portion of the air deflected from 26a is captured into cavity 18b which then passes through the opening between the ends 22a and 22b.

Notably, the opening between the ends 22a and 22b is significantly less than the opening between either ends 22a and 24b or 22b and 24a. Thus, as air moves into cavity 18b and through the narrower opening, a pressurized air stream is exerted on the cavity surface 18a.

Figure 3:
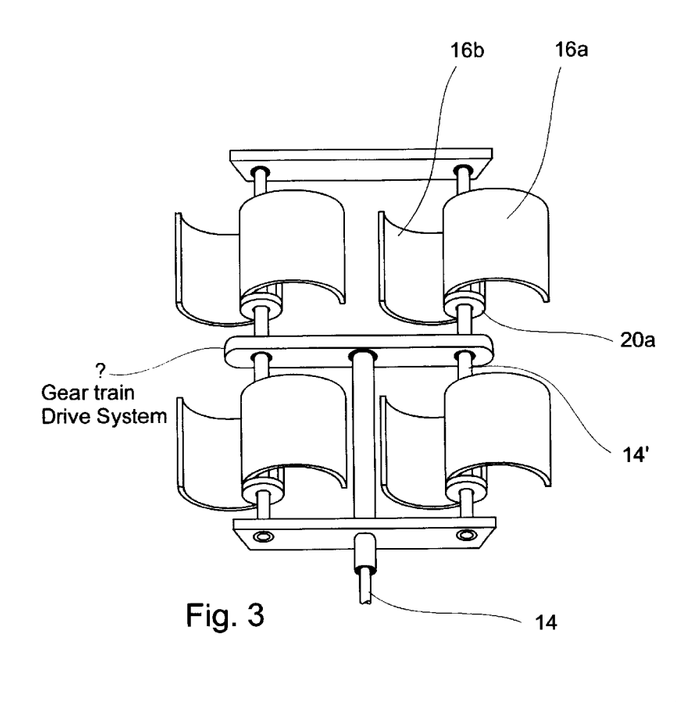
FIG. 3 is a perspective view of another embodiment plurality of cavity vertical turbines of the present invention.
Figure 4:
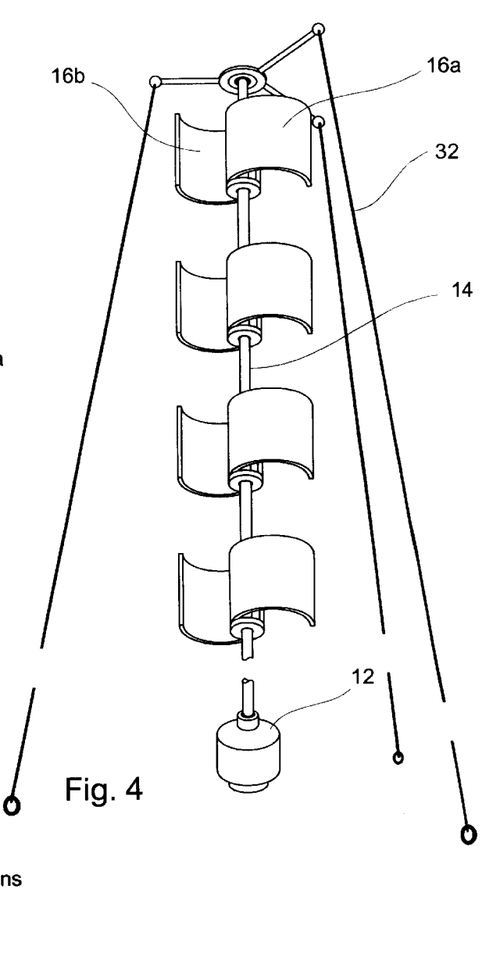
FIG. 4 is a perspective view of yet another embodiment plurality of cavity vertical turbines of the present invention.

FIGS. 3 and 4 illustrate the use of multiple members 16a and 16b. FIG. 3 shows the members 16a and 16b in a stacked and side by side relation. The stacked relation drive rotor shafts 14' and 14" which in turn drive rotor shaft 14 via a gear drive train mechanism (not shown) in housing 15. FIG. 4 depicts another stacked relation on a vertically disposed shaft 14. Connected to a top portion of the shaft 14 is a stabilizer member 30 to which stabilizing lines 32 are connected to enable securing the same to the ground.

Figure 9:
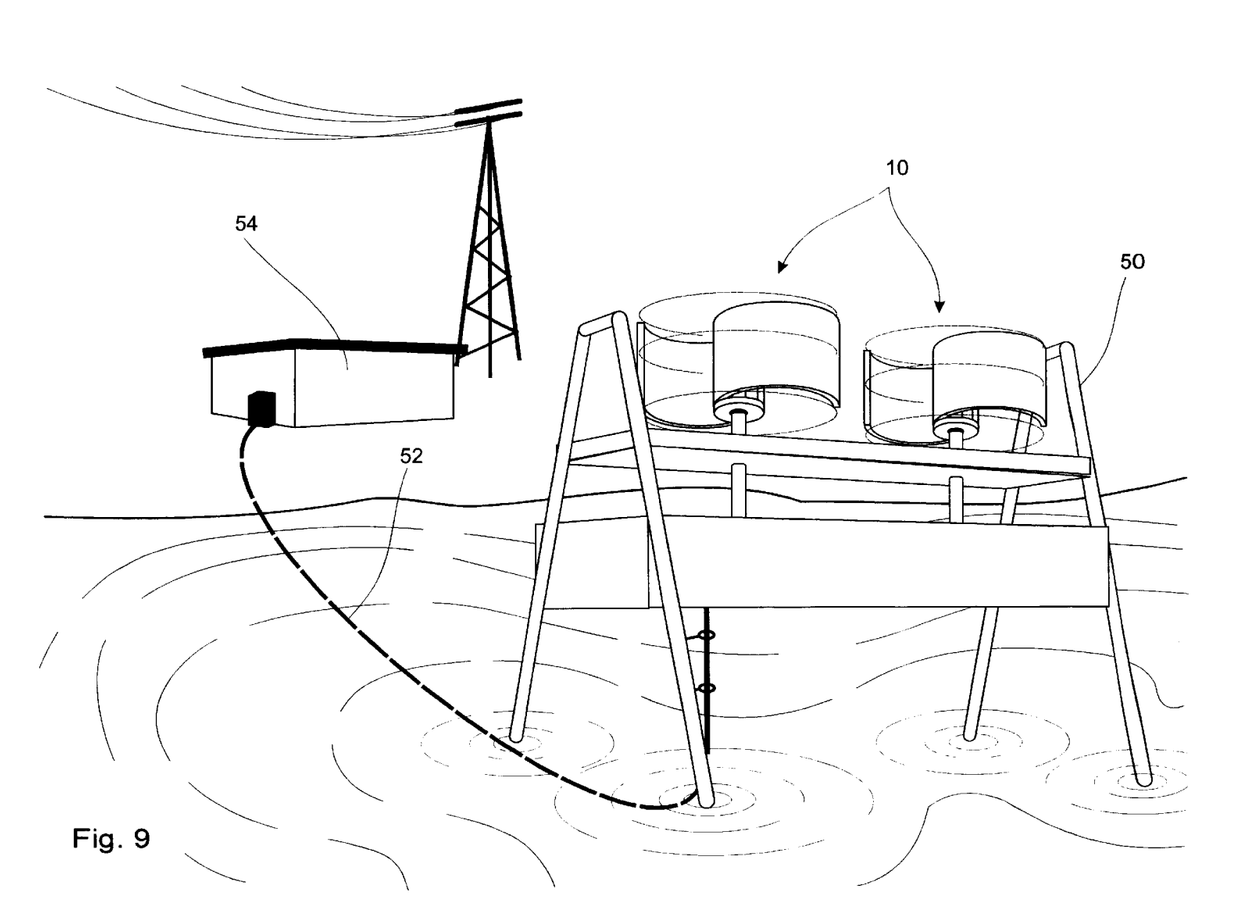
FIG. 9 is depiction of an offshore installation of cavity vertical turbines.

As shown in FIG. 9, the cavity vertical turbines 10 can be mounted in an offshore capacity. A support structure 50 can be suitably anchored to the ocean floor and suitable electrical line 52 (or air line) ran to the shore line to a power storage/supply/conversion facility 54. The cavity vertical turbines 10 can be located in prevailing winds and can move in any direction.

Figure 10A:
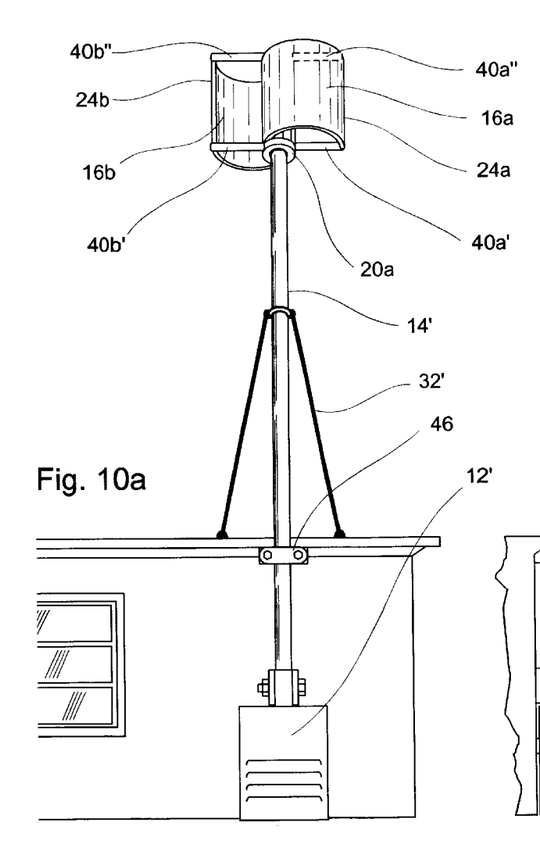
FIG. 10a is a perspective view of the cavity vertical turbine of FIG. 2 mounted on a building.
Figure 10B:
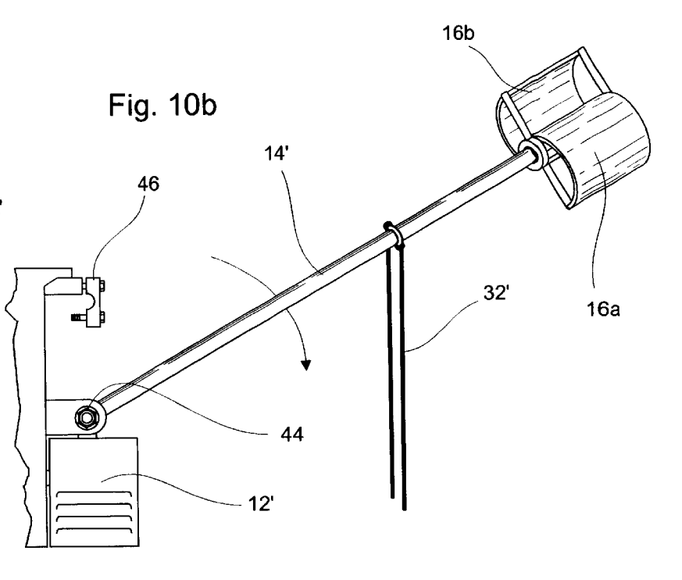
FIG. 10b is perspective view of another application of the cavity vertical turbine.

FIGS. 10a and 10b depict the cavity vertical turbine 10 mounted on a building to supply power thereto. The members 16a and 16b are additionally suited with tie pieces 40a', 40a" and 40b', 40b", respectively. Tie pieces 40a' and 40b' interconnect end 24a with plates 20a and 20b, respectively, and 40a" and 40b" interconnect end 24a with plates 20a and 20b, respectively. The rotor drive shaft 14' is rotatably connected to generator 12' (or air compressor). Here, the shaft 14' is shown to include a universal connection 44 to permit the lowering of thereof. A bearing mount 46 is shown removably connected to the building to provide stability of the rotor drive shaft 14'. Support lines 32' are also provided to interconnect and support the cavity vertical turbine 10.

Figure 5:
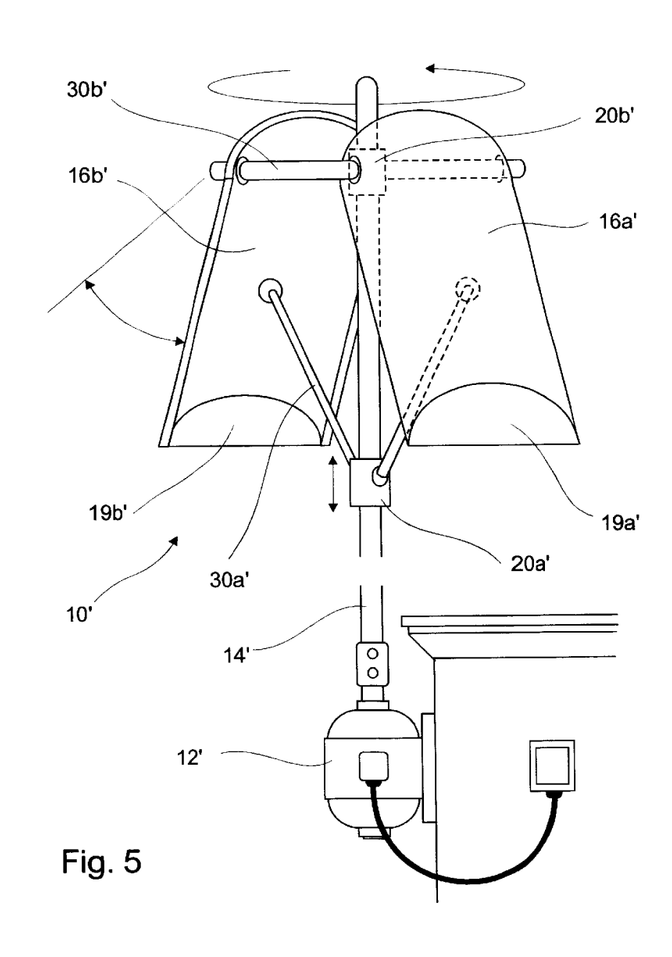
FIG. 5 is a perspective view of still another embodiment of a closed-end cavity vertical turbine of the present invention.

Turning now to the embodiment in FIG. 5, there is disclosed a closed-end cavity vertical turbine 10' which includes similar hemi-cylindrical members 16a' and 16b'. Here, the members 16a' and 16b' include an enclosed end 19a' and 19b', respectively. The members 16a' and 16b' are connected to collars 20a' and 20b' via tie bars 30a' and 30b', respectively. As shown, the members 16a' and 16b' are pitched at an incline narrower at the top and wider at the bottom and believed to aid in capturing air and redirecting it to the principle of the invention as previously described. The cavity vertical turbine 10' is shown here mounted to a building.

Figure 6:
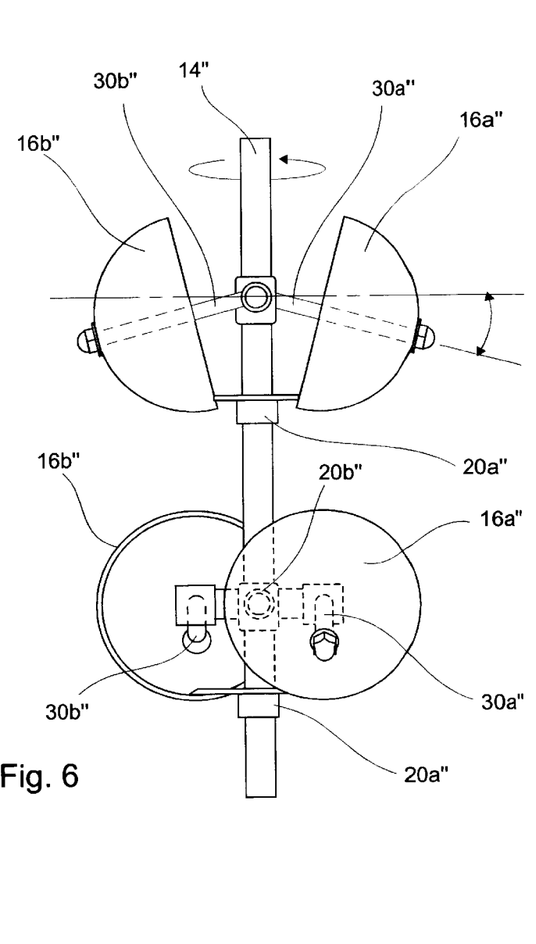
FIG. 6 is a perspective view of another embodiment plurality of cavity vertical turbines of the present invention.

In contrast, the embodiment shown in FIG. 6 depicts hemispherical members 16a" and 16b" which are inclined narrower at the bottom and wider at the top. The members 16a" and 16b" are connected to collars 20a" and 20b" via tie bars 30a" and 30b", respectively. In this depiction, there exist two sets of members 16a" and 16b", respectively. In this depiction, there exist two sets of members 16a" and 16b" which are in axially spaced relation at approximately 90 degrees.

The inclines shown in FIGS. 5 and 6 are believed to aid in the enhanced rotation of parts. It is contemplated that one particular incline may be of more use in the one hemisphere of the world than in the other due wind currents and the direction of rotation.

Figure 7:
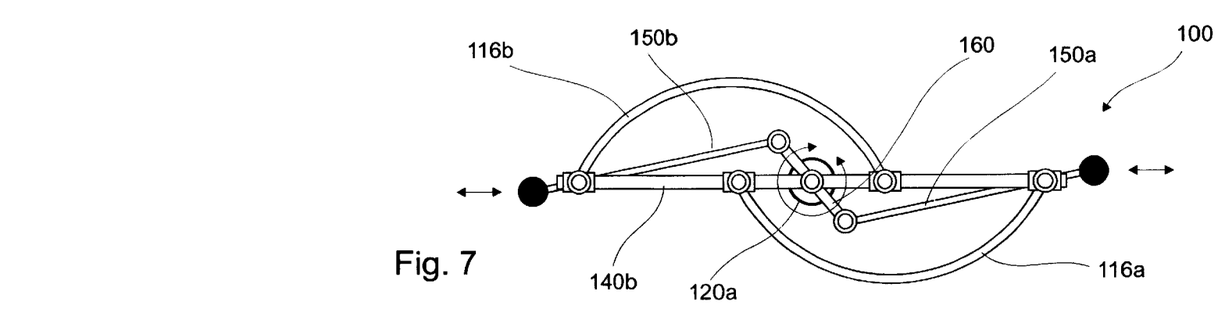
FIG. 7 is a top view of another embodiment of a self-regulating cavity vertical turbine of the present invention.
Figure 8:
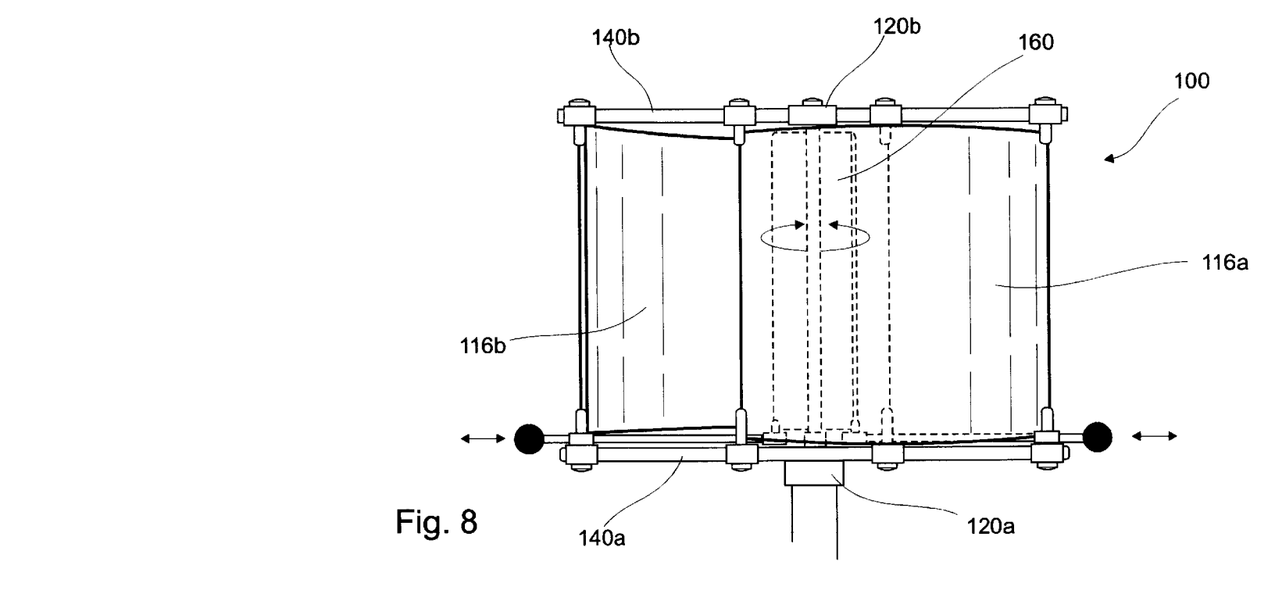
FIG. 8 is a perspective view of the cavity vertical turbine of FIG. 7.

Still another embodiment of the cavity vertical turbine 100 is disclosed in FIGS. 7 and 8 which is self regulating. The members 116a and 116b are interconnected via tie bars 140a and 140b. Tie bars 140a and 140b similarly connect to collars 120a and 120b, respectively. The principals set forth above apply to cause rotation of the rotor drive shaft 114, with an additional limitation of a self-regulations baffle 160. The baffle 160 is rotatably connected about the shaft 114 and is normally biased by a spring 170 to remain in an open position wherein air flow is permitted in a manner previously described. Ends of the baffle 160 are connected to a shaft 140a and 140b having weighted ends. The shafts 140a and 140b are shown here slidably connected to the tie bar 140a. As the rotational speed exceeds a predetermined amount, the force constant of the spring is overcome and the baffle 160 rotates to closed position, thus blocking air flow between the members 116a and 116b. This provides safety mechanism in times of extreme wind speed.

Figure 11:
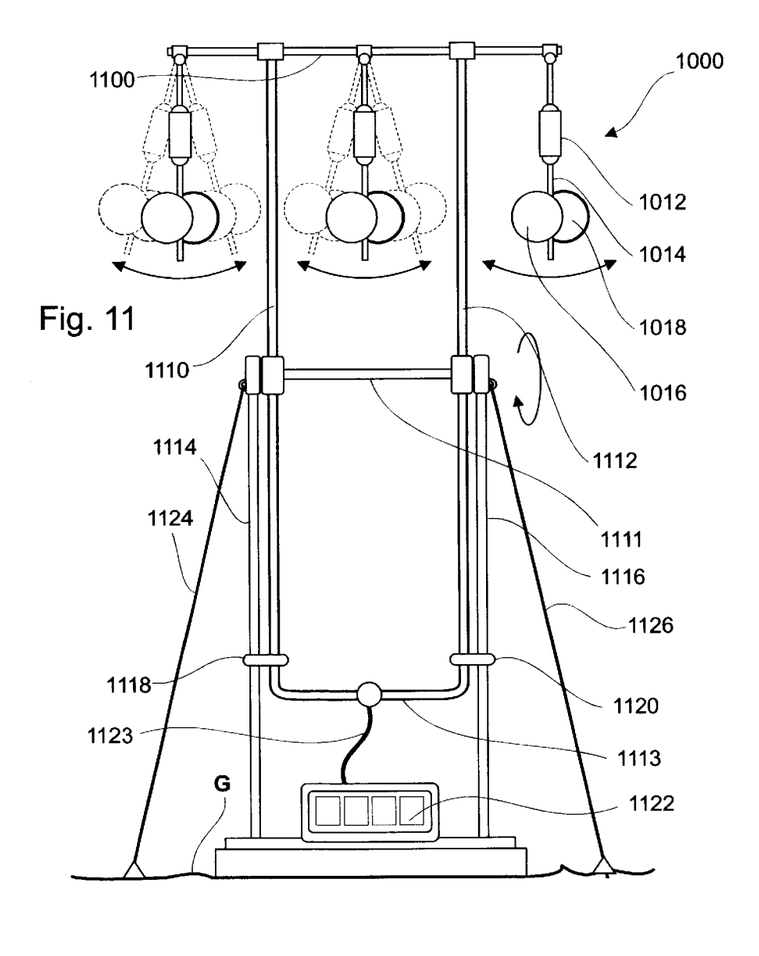
FIG. 11 is a side view another embodiment of the present invention.

Turning now to FIGS. 11–14, other embodiments of the invention are and operate on the same principles as previously described. The cavity turbine 1000 of FIG. 11 shows members 1016 and 1018 are connected to a drive shaft 1014 which connects to generator 1012 as described above with the generator 1012 movably connected to a horizontally disposed support member 1100.

The generator 1012 can be hingedly or universally joint connected to the member 1100. In this way, the cavity turbine 1000 is able to operate safely in varying wind conditions and directions where members 1016 and 1018 move from a vertically disposed position toward a horizontal position during a severe wind condition. The embodiment thus shown provides means for suspending the members 1016, 1018, shaft 1–14 and generator 1012 in a manner which permits multiple degree of freedom of movement in the x-y-z plane.

In FIG. 11, the horizontal member 1100 (which acts as an arm to suspend the members 1016 and 1018) is supported by vertical members 1110 and 1112, which are further interconnected by horizontal members 1111 and 1113. Vertical support members 1110 and 1112 are movably connected to vertical support members 1114 and 1116, respectively, at a point between ends of the vertical support members 1110 and 1012. Detachable connectors 1118 and 1120 interconnect the members 1110 to 1114 and 112 to 1116, respectively, in order to maintain the same in relative fixed position with respect to one another. Keeping in mind that the cavity turbines 1000 are normally disposed as shown in FIG. 11, connectors 1118 and 1120 may be disconnected to permit the cavity turbines 1000 to be pivoted to downwardly to enable maintenance service thereof as depicted in other embodiments of FIGS. 12 and 13, for example.

FIG. 11 shows a plurality of members 1016 and 1018, generators 1012, drive shafts 1014 all of which operatively connect to the transducer/battery storage device 1122 via an electrical line 1123. Also, there are anchor support lines 1124 and 1126 which interconnect the vertical support members 1114 and 1116 and the ground G.

Figure 12:
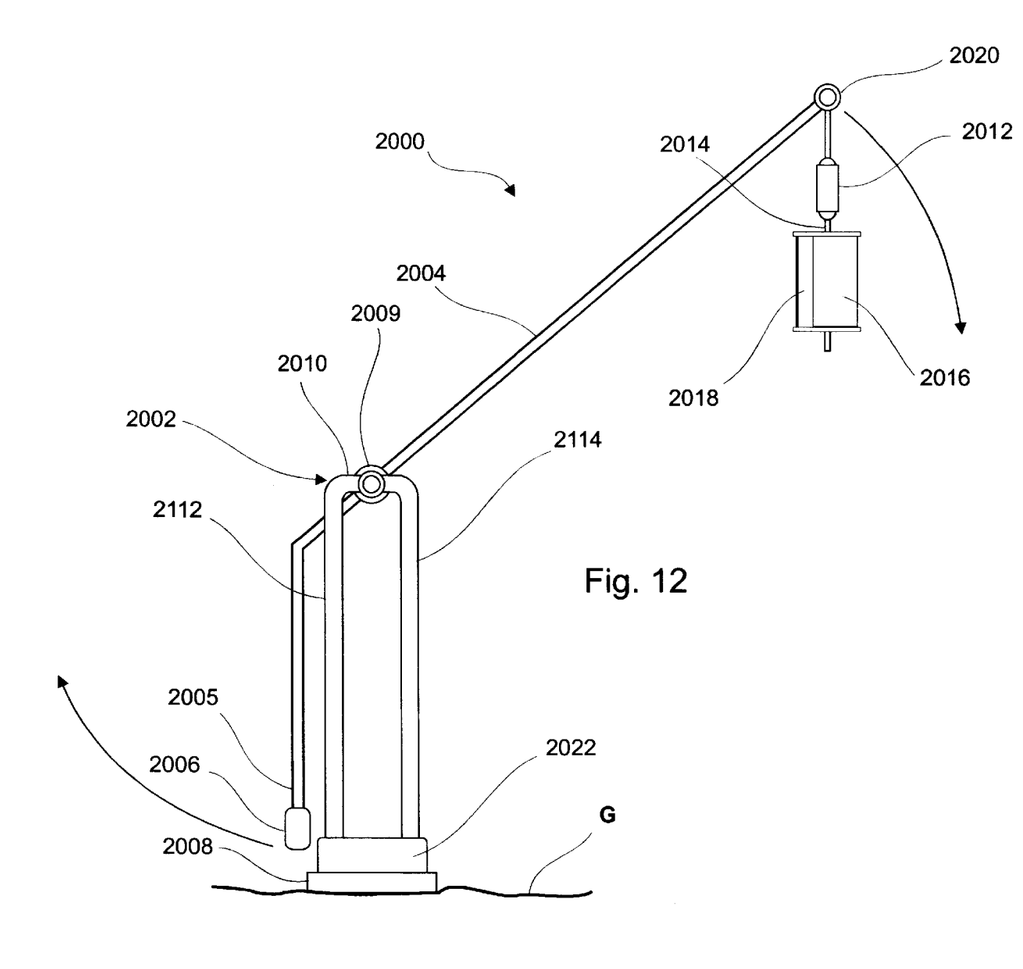
FIG. 12 is still another side view another view of the invention.

With respect to FIG. 12, a cavity turbine 2000 is disclosed. Here, a counter balanced support structure 2002 is shown. The structure 2002 includes a bent support arm 2004 having a ballast 2006 at one end 2005. The support arm 2004 is pivotally connected by a cross member 2009 to a horizontal supports 2010 (only one shown due to side view) which are in turn supported by vertical supports 2112 and 2114 (only one pair shown due to side view) and which are fixably connected to a base 2008. Similarly, a transducer/battery 2022 is provided to convert and store energy. The cavity members 2016 and 2018 are likewise connected to the drive shaft 2014 and generator 2012 which are movably connected to an end 2020 of the arm 2004 to provide the advantages previously discussed in severe wind conditions. Also, by unlocking the ballast 2006, the cavity turbine 2000 may be pivoted to permit service as before.

Figure 13:
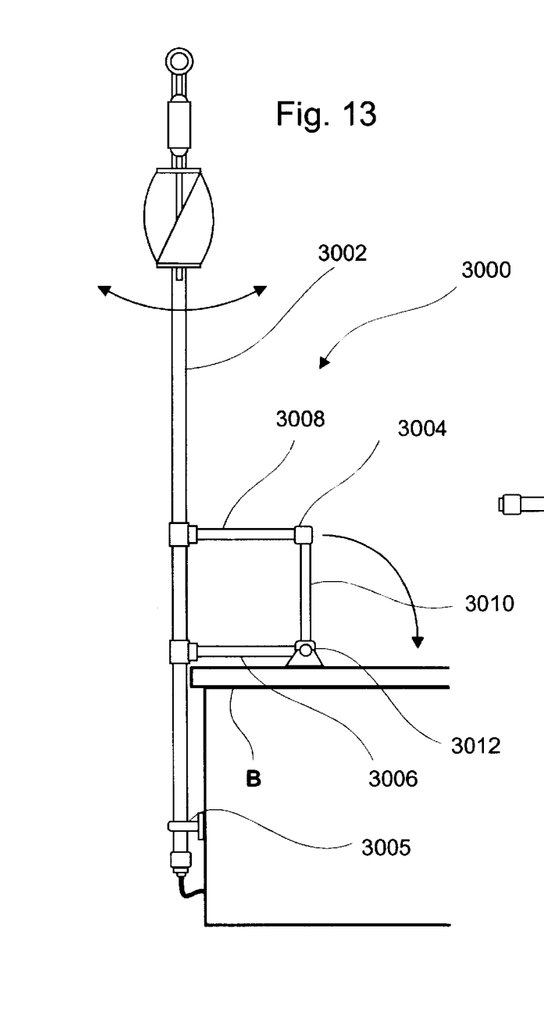
FIG. 13 is yet another side view another view of the invention.
Figure 14:
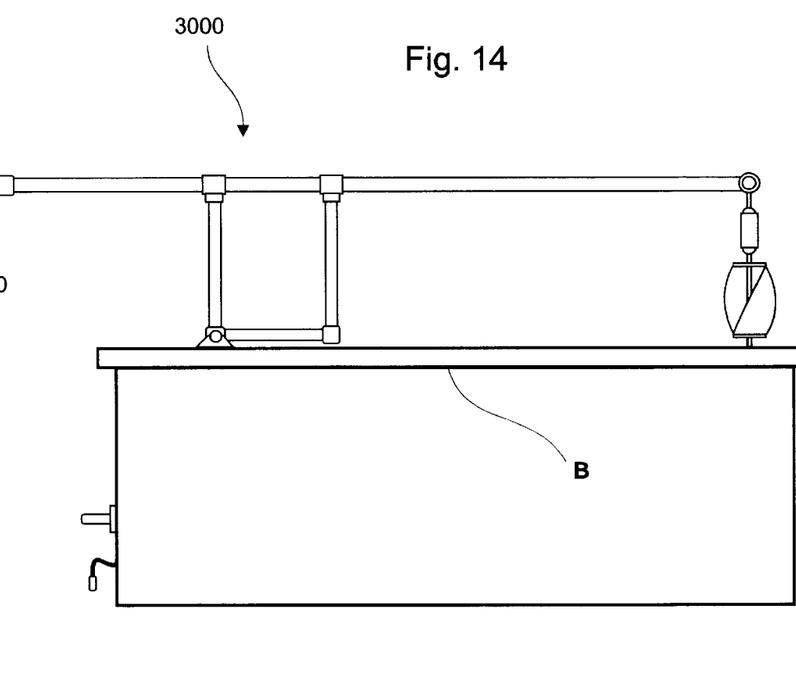
FIG. 14 is another side view another view of the invention.

FIGS. 13 and 14 depict another embodiment of the invention. Here, the cavity turbine 3000 is designed for connection to a building. Differences reside in the vertical support member 3002 being mountable to a building B. The vertical support 3002 releasably mounts to a side of the building B at its lower end via a releasable mount 3005. A pivotally roof-top mounted support bracket 3004 connects to the vertical support 3002 and roof of the building B. The bracket 3004 includes horizontal members 3006 and 3008 and vertical support member 3010 which rigidly interconnects an end of each of the members 3006 and 3008. Another end of the members 3006 and 3008 rigidly interconnects to the vertical support member 3002. The bracket 3004 is pivotally connected to the roof approximate the junction of the end of vertical support member 3006 and end of horizontal member 3010 via a releasable mount 3012. In this regard, when the mount 3005 is disconnected, the bracket 3004 permits the pivoting of the cavity turbine 3000 to the position as is shown in FIG. 14.

As used herein the term "vertical" is defined as a position generally normal to the earth's surface along the lines of the earth's gravitational forces. "Cavity vertical turbine" includes, but is not limited to, cavity surfaces as shown and described herein which are disposed on the vertical rotor drive shaft and have cavity members which generally rotate along a horizontal plane relative to the vertical position and gravitational forces stated. The above described embodiments are set forth by way of example and are not for the purpose of limiting the prevent invention. It will be readily apparent to those skilled in the art that obvious modifications, derivations and variations can be made to the embodiments without departing from the scope of the invention. Accordingly, the claims appended hereto should be read in their fall scope including any such modifications, derivations and variations.

What is claimed is:

1. A cavity turbine, comprising:
   a rotatably driven electric generator;
   a drive shaft operably connected to said electric generator to cause rotation thereof:
   a first member having a cavity surface and having means for connecting said first member to said shaft such that said cavity surface opposes said drive shaft in a spaced relation therefrom;
   a second member having a cavity surface and having means for connecting said second member to said shaft such that said cavity surface opposes said drive shaft in a spaced relation therefrom;
   wherein said cavity surfaces are further characterized to be in opposing partially overlapping relation to one another; and
   means for suspending said first member and said second member in a manner which permits freedom of movement between an operable and inoperable position by virtue of forces of air current directed at said members.

2. The cavity vertical turbine of claim 1, wherein said means for suspending said members permits multiple degrees of freedom of movement.

3. The cavity vertical turbine of claim 1, wherein said means for suspending said members includes at least one generally vertically extending support, an arm extending from said support and means for movably interconnecting said members and said arm.

4. The cavity vertical turbine of claim 1, wherein said first cavity surfaces overlap in a manner such that surface area overlapping portions of said cavity surfaces are less than surface areas of non-overlapping portions of cavity surfaces.

5. The cavity vertical turbine of claim 1, wherein said cavities are further characterized such that when air currents hit a non-overlapping portion of said cavity surface at least a portion of the air is deflected into an overlapping portion of said opposing cavity surface causing operable rotation of said members about said shaft.

6. The cavity vertical turbine of claim 5, wherein air current forces reach a predetermined amount, said members move to an inoperable position.

7. The cavity vertical turbine of claim 1, said means for suspending is further characterized to enable height adjustment thereof.

8. A cavity vertical turbine, comprising:
   a rotatably driven air compressor;
   a drive shaft operably connected to said air compressor to cause generation of compressed air therefrom;
   a first member having a cavity surface and having means for connecting said first member to said shaft such that said cavity surface opposes said drive shaft in a spaced relation therefrom;

a second member having a cavity surface and having means for connecting said second member to said shaft such that said cavity surface opposes said drive shaft in a spaced relation therefrom;

wherein said cavity surfaces are further characterized to be in opposing partially overlapping relation to one another; and means for suspending said first member and said second member in a manner which permits freedom of movement between an operable and inoperable position by virtue of forces of air current directed at said members.

9. The cavity vertical turbine of claim 8, wherein said means for suspending said members permits multiple degrees of freedom of movement.

10. The cavity vertical turbine of claim 8, wherein said means for suspending said members includes at least one generally vertically extending support, an arm extending from said support and means for movably interconnecting said members and said arm.

11. The cavity vertical turbine of claim 8, wherein said first cavity surfaces overlap in a manner such that surface area overlapping portions of said cavity surfaces are less than surface areas of non-overlapping portions of cavity surfaces.

12. The cavity vertical turbine of claim 8, wherein said cavities are further characterized such that when air currents hit a non-overlapping portion of said cavity surface at least a portion of the air is deflected into an overlapping portion of said opposing cavity surface causing operable rotation of said members about said shaft.

13. The cavity vertical turbine of claim 12, wherein air current forces reach a predetermined amount, said members move to an inoperable position.

14. The cavity vertical turbine of claim 8, said means for suspending is further characterized to enable height adjustment thereof.

15. The cavity vertical turbine of claim 1, wherein said members are in fixed relation to one another.

16. The cavity vertical turbine of claim 8, wherein said members are in fixed relation to one another.

17. The cavity vertical turbine of claim 3, wherein said means for suspending includes said shaft having one end connected to said arm and wherein said members disposed adjacent another end of said shaft which is free to move.

18. The cavity vertical turbine of claim 10, wherein said means for suspending includes said shaft having one end connected to said arm and wherein said members disposed adjacent another end of said shaft which is free to move.

\* \* \* \* \*